(12) United States Patent
Bentov (10) Patent No.: US 11,805,319 B1
(45) Date of Patent: Oct. 31, 2023

(54) SELF-ORGANIZING SENSOR SYSTEM OF CAMERAS

(71) Applicant: Apple Inc., Cupertino, CA (US)

(72) Inventor: Izhar Bentov, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/933,026

(22) Filed: Sep. 16, 2022

(51) Int. Cl.
*H04N 23/695* (2023.01)
*H04N 23/50* (2023.01)

(52) U.S. Cl.
CPC ........... *H04N 23/695* (2023.01); *H04N 23/50* (2023.01)

(58) Field of Classification Search
CPC ...... H04N 23/695; H04N 23/50; H04N 23/67; H04N 23/671; H04N 23/55; H04N 23/54; H04N 23/959; H04N 23/63; H04N 23/68; H04N 23/683; G02B 7/04; G02B 7/08; G02B 7/40; G02B 7/486; G02B 7/28; G02B 7/008; G02B 7/028; G02B 5/32; G01S 17/36; G01S 17/10; G01S 17/86; G03B 13/36
USPC .................................................... 348/207.99
See application file for complete search history.

(56) References Cited

U.S. PATENT DOCUMENTS

| | | | |
|---|---|---|---|
| 8,786,715 B2 | 7/2014 | Lee | |
| 9,445,013 B2 * | 9/2016 | Foster | H04N 23/90 |
| 9,560,260 B2 * | 1/2017 | Foster | H04N 5/33 |
| 11,002,854 B2 * | 5/2021 | Weber | H04N 23/67 |
| 11,422,257 B2 * | 8/2022 | Weber | G01S 7/486 |
| 2015/0200612 A1 * | 7/2015 | Matsukawa | H10N 30/2023 310/323.01 |
| 2016/0014345 A1 * | 1/2016 | Foster | H04N 23/45 348/164 |
| 2016/0156831 A1 * | 6/2016 | Foster | G03B 3/00 348/349 |
| 2016/0219202 A1 * | 7/2016 | Barros | A45C 13/1076 |
| 2016/0363462 A1 * | 12/2016 | English | G01D 5/20 |
| 2018/0149826 A1 | 5/2018 | Lei et al. | |
| 2019/0011557 A1 * | 1/2019 | Weber | G01S 17/86 |
| 2020/0319337 A1 * | 10/2020 | Weber | G01S 17/36 |
| 2021/0231915 A1 * | 7/2021 | Barros | A45C 13/002 |
| 2021/0294070 A1 * | 9/2021 | Tanaka | G03B 13/36 |
| 2021/0405132 A1 * | 12/2021 | Kubota | G01R 33/098 |
| 2022/0263999 A1 * | 8/2022 | Hanayama | H04M 1/0264 |

* cited by examiner

*Primary Examiner* — Pritham D Prabhakher
(74) *Attorney, Agent, or Firm* — Robert C. Kowert; Kowert, Hood, Munyon, Rankin & Goetzel, P.C.

(57) ABSTRACT

A camera may a plurality of sensors to measure positions of lenses and/or image sensor for control the positions of the lenses and/or image sensor for various image capturing functions. The camera may include a control circuit for configuring the sensors. The control circuit may include a plurality of conductors arranged in different patterns relative to different sensors installed at different locations. The control circuit may use the conductors to generate magnetic field(s) on the sensors, and use the magnetic field to configure the sensors. Once configured, the control circuit may communicate with the sensors based on the sensors' configuration, to obtain position measurements from the sensors to control the actuators.

20 Claims, 9 Drawing Sheets

SELF-ORGANIZING SENSOR SYSTEM OF CAMERAS

BACKGROUND

Technical Field

This disclosure relates generally to a camera and, more specifically, to a sensor system of a camera.

Description of the Related Art

Almost all of today's mobile devices (e.g., smartphones, laptops, tablets, wearable devices, other tab devices, etc.) include cameras. Sometimes, a camera may integrate various functions for capturing images, e.g., autofocus (AF) and/or optical image stabilization (OIS) functions. For example, a camera may include an AF system whereby the relative distance between a lens and an image sensor may be adjusted to focus an object plane in front of the camera at an image plane to be captured by the image sensor. Also, a camera may include an OIS system that may sense and react to external excitation/disturbance by adjusting location of an image sensor relative to a lens of the camera in an attempt to compensate for unwanted motion of the lens. Generally, a camera may use a controller to configure position sensors and then receive measurements of positions of the lens and/or image sensor of the camera from the position sensors. The controller may execute control algorithms based on the sensors' position measurements to control an actuator to move the lens and/or image sensor to implement the AF and/or OIS functions. The advent of portable devices has resulted in an increased requirement for image capturing of cameras. Generally, this means more position sensors in order to measure the positions of a camera's movable components and control the movable components in various directions. Generally, the controller may be electrically coupled through wires with each individual sensors for performing configuration of the sensors. However, as the number of sensors increases, a camera may require more wiring connections and thus more spacing for the hardwire-based one-to-one communication between these components. Often this becomes a challenge especially in design of portable devices. Thus, it is desirable for a sensor system that can efficiently organize and configure position sensors of a camera.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to a sensor system of a camera. In some embodiments, the sensor system may include at least one controller, one or more actuators, and a plurality of sensors. The controller may configure the sensors, e.g., during an initialization stage. During the configuration, the controller may assign respective IDs (identifications) to respective ones of the sensors. Once completed, the sensor system may proceed to an actuation stage in which the controller may use the assigned IDs to communicate with the sensors. For example, the controller may use the sensors to measure positions of one or more lenses and/or an image sensor of the camera, which may then be used by the controller to control actuators. In some embodiments, the sensor system may include a communication bus (e.g., a serial communication bus such as an Integrated Circuits or I$^2$C bus) for communications between the controller and sensors in the actuation stage. In some embodiments, the sensors may be installed at different locations across the camera, and thus measure the positions of the lenses and/or image sensor in various directions and/or angles. In the actuation stage, the controller may obtain the position measurements from the sensors, and execute one or more algorithms to control the actuators to move the lenses and/or image sensor to implement various image capturing related functions. For example, the actuators may move the lenses and/or image sensor in a direction parallel to the optical axis of the lenses to implement an autofocus (AF) function. Also, the actuators may move the lenses and/or image sensor in one or more directions orthogonal to the optical axis to implement an optical image stabilization (OIS) function. In addition, in some embodiments, the actuators may rotate the lenses and/or image sensor around one or more axes parallel and/or orthogonal to the optical axis of the lenses to compensate for yaw, pitch, and/or roll disturbances. In some embodiments, the dis- closed camera may be integrated as part of a portable device, e.g., a smartphone, laptop, tablet, wearable device, and the like.

In some embodiments, during the initialization stage, the sensor system may configure the sensors installed at different locations of the camera, e.g., to assign respective identifications (IDs) to the respective sensors. In some embodiments, the configuration of the sensors may be implemented in a contactless fashion, e.g., using a magnetic field. For example, the sensor system may include two or more conductors (e.g., electrical wires) routed around the sensor installed at different locations of the camera. In addition, the conductors may be arranged in different patterns (e.g., routed in different directions and/or angles) relative to the individual sensors at these different locations. In the initialization, the controller of the sensor system may cause respective currents to flow through the respective conductors, and the currents collectively may generate a "composite" magnetic field upon the respective sensors. Given that the conductors are routed in different patterns at these different locations, the composite magnetic field may have different magnitudes and/or different directions at these different locations, which may be measured by the respective sensors. The difference of the magnetic field at the different locations may thus be used to transfer different IDs to the sensors at these different locations. For example, when a first sensor at a first location measures that a direction of the magnetic field is at an angle of 22.5 degrees (or 22.5°), the first sensor may automatically acquire (or self-assign) a first ID of "sensor no. 1," whereas when a second sensor senses that the direction of the magnetic field is at an angle of 45 degrees (or 45°), the second sensor may automatically acquire (or self-assign) a second ID of "sensor no. 2," and so on. Once acquired, the sensors may provide their respective measurements and/or IDs to the controller. In turn, the controller may use the information to organize the sensors. For example, upon receipt of the information from the sensors, the controller may turn off or deactivate the currents of the conductors and notify the sensors of the receipt of the information, and then the controller and sensors may proceed to the above described actuation stage. In the actuation stage, the controller may use the sensor IDs, e.g., as the sensors' addresses, to communicate with each individual sensor, obtain position measurements, and control actuators.

In some embodiments, in the initialization, the controller may also determine the respective installation locations of the sensors. For example, the controller may have information (e.g., a lookup table) stored in a memory beforehand, which represents a relationship between measurements of the magnetic field and sensor installation locations. Based on the measurements and/or IDs from the sensors, the controller may compare the information from the sensors with the relationship information, and accordingly determine the respective installation locations of the sensors. In some embodiments, the sensors may include various magnetic position sensors, e.g., tunnel magnetoresistance (TMR) sensors, giant magnetoresistance (GMR) sensors, Hall effect sensors, and the like. In some embodiments, the individual sensors may include analog-to-digital conversion circuits and/or communication circuits for measuring the magnetic field and/or communicating the above described information with the controller.

In some embodiments, the sensor system may use one or more of the conductors to cause the sensors to enter the initialization stage. For example, the controller may cause a current to flow through one of the above described conductors. The current may be controlled to have a certain pattern, e.g., the current may be turned on and off at a frequency to thus create a pulsed current. In turn, the pulsed current may generate a pulsed magnetic field upon the sensors. Given the magnetic field's unique pattern, all the sensors may be able to recognize it even though the sensors may be installed at different locations, and thus automatically enter the above described initialization stage.

The disclosed sensor system provides obvious benefits over traditional sensor systems of a camera. As described above, a traditional sensor system generally uses electrically wires to connect a controller with each individual sensors for performing configuration of the sensors. This approach is impractical at scale once the number of sensors increases. By comparison, the disclosed sensor system may use only a limited number of conductors to generate a magnetic field to configure the sensors in a contactless fashion. This can reduce the number of wires as well as spacing for routing the wires. As a result, this simplifies design of the sensor system to provide desired scalability for implementing various image capturing related functions (e.g., AF and/or OIS functions) in the camera.

Figure 1:
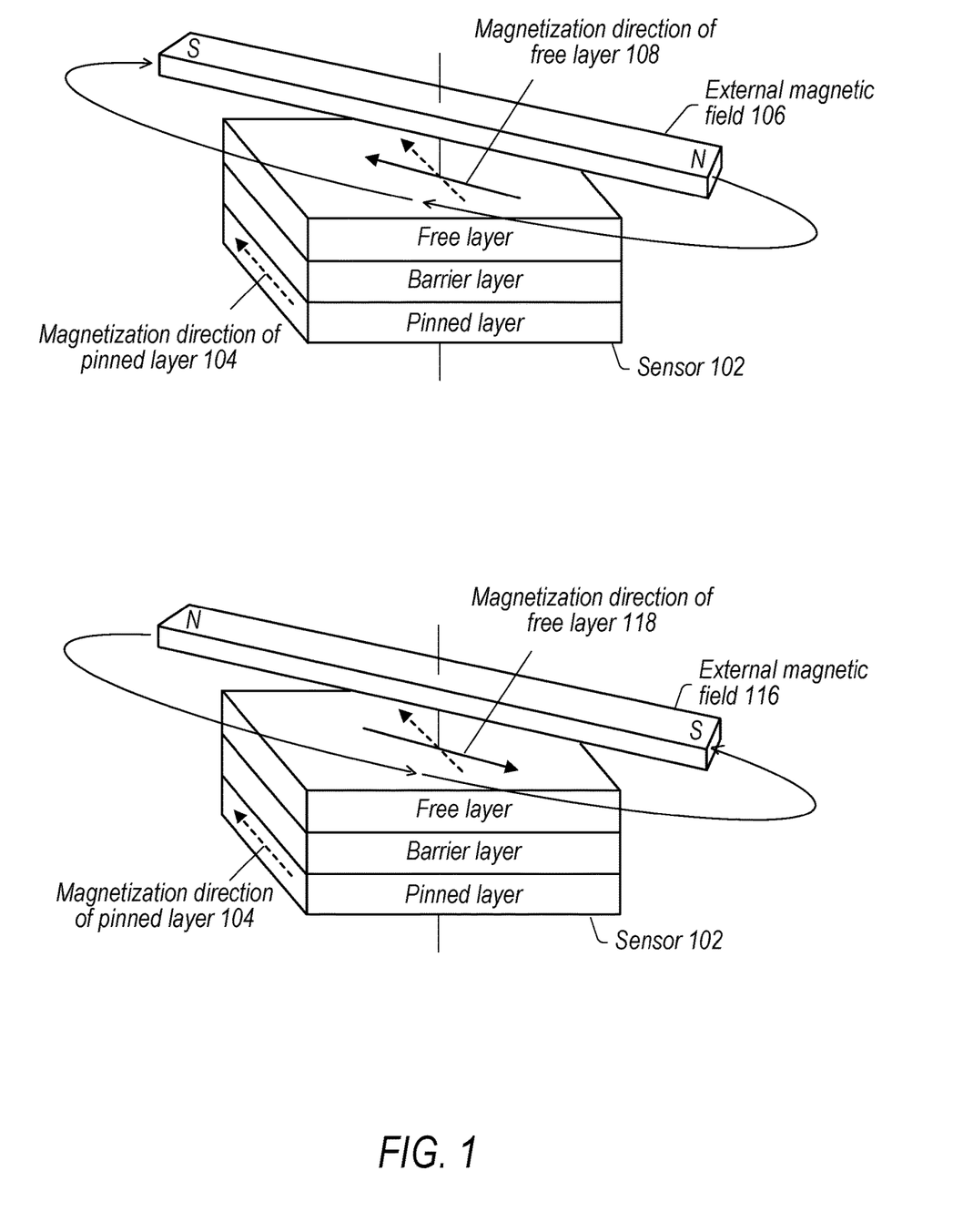
FIG. 1 shows example arrangements between a position sensor and a magnetic field for sensor configuration, according to some embodiments.

FIG. 1 is a diagram showing example arrangements between a position sensor and a magnetic field for sensor configuration, according to some embodiments. For purposes of illustration, this figure shows a TMR sensor as an example position sensor. But the concept may apply to other types of position sensors, e.g., GMR sensors, Hall effect sensors, etc. As indicated in FIG. 1, sensor 102 may include a multilayer, thin-film stack composed of a sandwiched structure with a free layer, a barrier layer, and a pinned layer. The free layer and pinned layer are ferromagnetic layers each having a magnetic field, and the barrier layer separates the ferromagnetic free layer and pinned layer from one another. The ferromagnetic pinned layer is magnetically oriented in a fixed direction 104 (illustrated by a dashed line), whereas the ferromagnetic free layer rotates in response to an external magnetic field (and that is why this layer is called the "free" layer). The resistance between the free layer and pinned layer varies according to the relative orientation between the magnetic directions of the two layers. In other words, sensor 102 may be considered as a magnetic field regulated resistor. Thus, when external magnetic field 106 approaches sensor 102, it may rotate the ferromagnetic free layer to magnetization direction 108 (illustrated by a solid line) and generate a first resistance between the free and pinned layers of sensor 102, whereas when a different external magnetic field 116 approaches sensor 102, it may orientate the ferromagnetic free layer to magnetization direction 118 (illustrated by a solid line) and cause a second resistance between the free and pinned layers of sensor 102. In addition, the magnitude or strength of the external magnetic fields 106 and 116 may also affect the alignment between the ferromagnetic free layer with respect to the external magnetic fields. Thus, by changing the direction and/or magnitude of an external magnetic field upon sensor 102, sensor 102 may generate corresponding, different resistance. Vice versa, based on measurement of the resistance, sensor 102 may be able to measure the direction and/or magnitude of the external magnetic field.

As described above, in some embodiment, a camera may include a sensor system that may transfer configuration information (e.g., IDs) to sensors installed at different locations across the camera using a magnetic field. For example, the sensor system may generate an external magnetic field in a first direction and/or magnitude on a first sensor at a first location. When the first sensor measures the magnetic field, the first sensor may automatically acquire a first sensor ID of "sensor no. 1." For example, the first sensor may assign the first sensor ID to itself. Similarly, the sensor system may generate an external magnetic field in a second direction and/or magnitude on a second sensor at a second location. When the second sensor measures the magnetic field, the second sensor may automatically acquire a second sensor ID of "sensor no. 2." In some embodiments, the external magnetic fields at the different locations may be created using the same set of conductors. For example, the same set of conductors may be arranged in different patterns relative to the first and second sensors at the different locations, thus generating a magnetic field on the two sensors in different directions and/or magnitudes. Alternatively, in some embodiments, the external magnetic fields at the different locations may be created using different sets of conductors. For example, the external magnetic field for the first sensor may be induced by a first set of conductors, whereas the external magnetic field for the second sensor may be induced by a second set of conductors. The first set and second set may have same (or different) numbers of conductors, arranged in different patterns, such that the two sets of conductors may generate different magnetic fields upon the different sensors.

Figure 2:
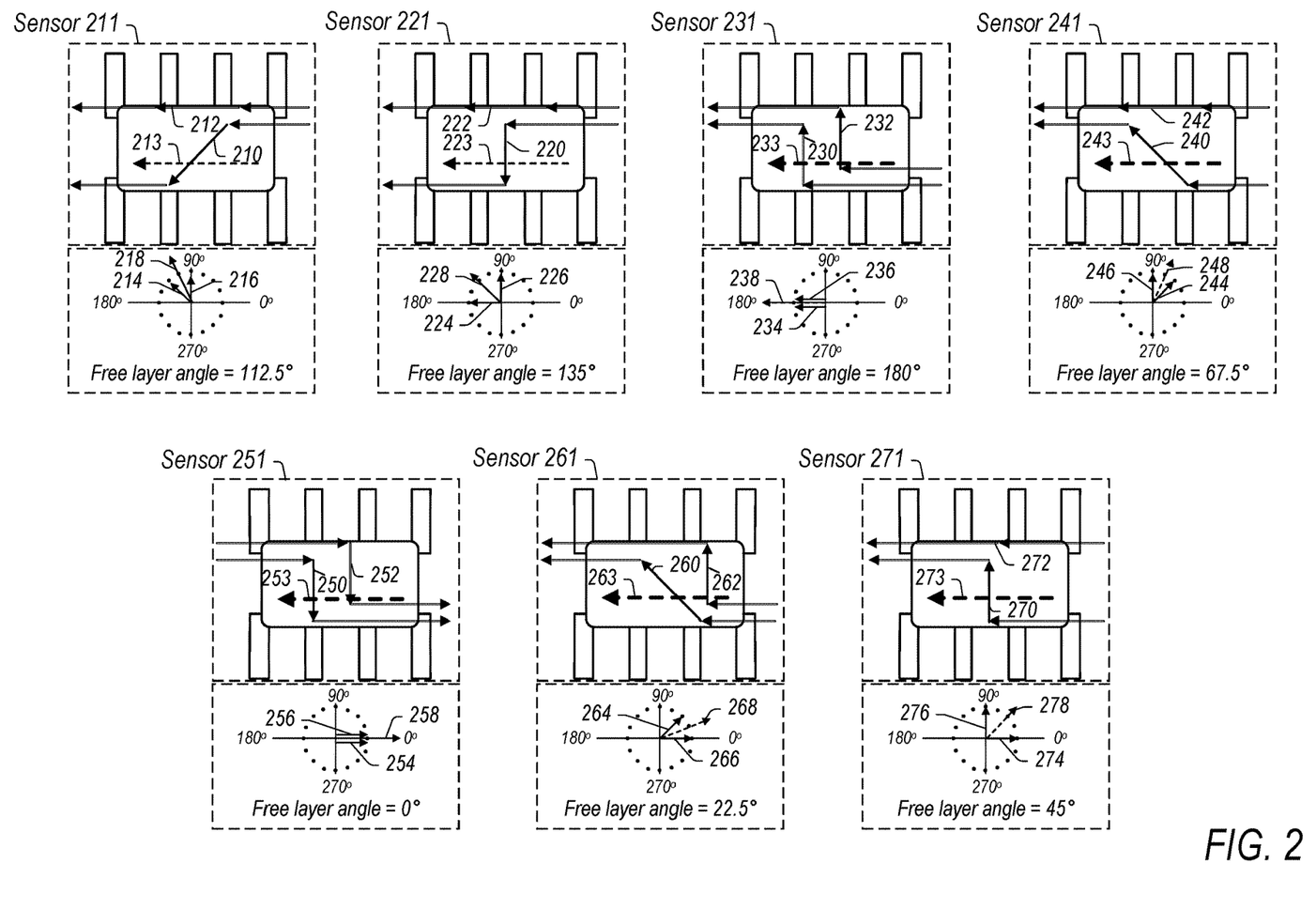
FIG. 2 shows an example sensor system of a camera that includes multiple conductors for configuring sensors, according to some embodiments.

FIG. 2 shows an example sensor system of a camera that includes multiple conductors for configuring sensors, according to some embodiments. In this example, the arrangement of a set of two conductors (e.g., electrical wires) relative to seven different sensors (e.g., sensors 211, 221, 231, 2451, 251, 261, and 271) installed at seven different locations of the camera is provided to illustrate performance of the configuration of the sensors using a magnetic field, according to some embodiments. Again, for purposes of illustration, the sensors are assumed to be TMR sensors. But the described configuration may be performed on other types of magnetic sensors, e.g., GMR sensors, Hall effect sensors, and the like.

As indicated in FIG. 2, sensor 211 may have a ferromagnetic pinned layer magnetically oriented in direction 213 at an angle of 180 degrees (or 180°). In some embodiments, the sensor system may include a set of two conductors routing proximate sensor 211, e.g., underneath sensor 211. In some embodiments, the two conductors may be arranged in directions 210 and 212 to conduct respective currents, as indicated in FIG. 2. For example, the current of a first conductor may flow in direction 210 at an angle of 235 degrees (or 235°), and the current of a second conductor may flow in direction 212 at an angle of 180 degrees (or 180°). Accordingly, the two currents may generate respective magnetic fields in directions 214 at an angle of 135 degrees (or 135°) and 216 at an angle of 90 degrees (or 90°), and collectively they may generate a "composite" magnetic field in the direction 218. The composition of the two magnetic fields into the "composite" magnetic field is illustrated in a vector diagram below sensor 211. As shown in the vector diagram, direction 128 of the "composite" magnetic field is approximately at an angle of 112.5 degrees (or 112.5°). As described above, the "composite" magnetic field may rotate the ferromagnetic free layer also to approximately direction 218 at the angle of 112.5 degrees (or 112.5°). The relative orientation between the "composite" magnetic field (in direction 218 or at the angle of 112.5°) and the ferromagnetic pinned layer (in direction 213 or at the angle of 180°) may be measured based on measurement of the resistance of sensor 211. As described in more detail below, the measurement of the "composite" magnetic field by sensor 211 may be different from the measurement of the "composite" magnetic field by another sensor installed at a different location. Thus, the difference of the magnetic field by the different sensors at the different locations may be used to transfer different IDs to the different sensors. In some embodiments, sensor 211 may include an analog-to-digital conversion circuit which may convert the measured resistance from an analog value to a digital value. In some embodiments, based on the digital value of the measured resistance, sensor 211 may automatically acquire a corresponding ID (e.g., "sensor 211") or define the ID for itself. In addition, in some embodiments, sensor 211 may include a communication circuit which may provide the acquired ID and/or measured resistance to a controller of the sensor system.

Similarly, the set of two conductors may also be routed proximate sensor 221. In some embodiments, sensor 221 may be installed at a different location inside the camera from sensor 211. For purposes of illustration, in this example, it is assumed that the ferromagnetic pinned layer of sensor 221 is magnetically oriented in direction 223 at an angle of 180 degrees (or 180°). However, the conductors may be routed in a different arrangement relative to sensor 221 from sensor 211. For example, as indicated in FIG. 2, the current of the first conductor may flow in direction 222 at an angle of 180 degrees (or 180°), whereas the current of the second conductor may flow in direction 220 at an angle of 270 degrees (or 270°) (which is different from direction 210 in the case of sensor 211). Accordingly, the two currents may respectively generate magnetic fields in directions 224 at an angle of 180 degrees (or 180°) and 226 at an angle of 90 degrees (or 90°). The two magnetic fields may thus be composited into a "composite" magnetic field in direction 228 at an angel of 135 degrees (or) 135°, as shown in a vector diagram below sensor 221. Thus, the composite magnetic field may have a different direction on sensor 221 from sensor 211. As described above, this "composite" magnetic field may be measured by sensor 221. Similarly, based on measurement of the composite magnetic field, sensor 221 may acquire a different ID ("sensor 221") from sensor 211.

The arrangement of the set of conductors in respective patterns relative to other sensors 231, 241, 251, 261, and 271 is also shown in FIG. 2. Given that the different patterns of the conductors relative to the different sensors, the conductors may generate a composite magnetic field upon these different sensors in different directions and/or magnitudes. Thus, the controller may use the composite magnetic field to assign respective IDs to the different sensors. For example, sensor 231 may include a ferromagnetic pinned layer magnetically oriented in direction 233. In some embodiments, the two conductors may be arranged and accordingly conduct respective currents in directions 230 and 232. The currents may generate respective magnetic fields in directions 234 and 236, which collectively may generate a "composite" magnetic field in direction 238 at an angel of 180 degrees (or 180°), as shown in the vector diagram. Based on measurement of the composite magnetic field at the angle of 180 degrees (or 180°), sensor 231 may acquire a corresponding sensor ID (e.g., "sensor 231"). Similarly, in some embodiments, sensor 241 may include a ferromagnetic pinned layer magnetically oriented in direction 243. In some embodiments, the two conductors may be arranged and accordingly conduct respective currents in directions 240 and 242. The currents may generate respective magnetic fields in directions 244 and 246, which collectively may generate a "composite" magnetic field in direction 248 at an angel of 67.5 degrees (or 67.5°), as shown in the vector diagram. Based on measurement of the composite magnetic field at the angle of 67.5 degrees (or 67.5°), sensor 241 may acquire a corresponding sensor ID (e.g., "sensor 241"). Similarly, in some embodiments, sensor 251 may include a ferromagnetic pinned layer magnetically oriented in direction 253. In some embodiments, the two conductors may be arranged and accordingly conduct respective currents in directions 250 and 252. The currents may generate respective magnetic fields in directions 254 and 256, which collectively may generate a "composite" magnetic field in direction 258 at an angel of 0 degrees (or 0°), as shown in the vector diagram. Based on measurement of the composite magnetic field at the angle of 0 degrees (or 0°), sensor 251 may acquire a corresponding sensor ID (e.g., "sensor 251"). Similarly, in some embodiments, sensor 261 may include a ferromagnetic pinned layer magnetically oriented in direction 263. In some embodiments, the two conductors may be arranged and accordingly conduct respective currents in directions 260 and 262. The currents may generate respective magnetic fields in directions 264 and 266, which collectively may generate a "composite" magnetic field in direction 268 at an angel of 22.5 degrees (or 22.5°), as shown in the vector diagram. Based on measurement of the composite magnetic field at the angel of 22.5 degrees (or 22.5°), sensor 261 may acquire a corresponding sensor ID (e.g., "sensor 261"). Similarly, in some embodiments, sensor 271 may include a ferromagnetic pinned layer magnetically oriented in direction 273. In some embodiments, the two conductors may be arranged and accordingly conduct respective currents in directions 270 and 272. The currents may generate respective magnetic fields in directions 274 and 236, which collectively may generate a "composite" magnetic field in direction 238 at an angel of 45 degrees (or 45°), as shown in the vector diagram. Based on measurement of the composite magnetic field at the angel of 45 degrees (or 45°), sensor 271 may acquire a corresponding sensor ID (e.g., "sensor 271").

In some embodiments, once a sensor acquires an ID, the sensor may provide the ID and/or associated measurements of the magnetic field to a controller of the sensor system. In some embodiments, upon receipt of the ID of a sensor, the controller may further determine the installation location of the sensor inside the camera. For example, in some embodiments, the controller may have information (e.g., a lookup table stored in a memory) beforehand, which represents a relationship between measurements of a magnetic field and sensor installation locations. Based on ID and/or associated measurement from the sensor, the controller may compare the information from the sensors with the relationship information, and accordingly determine the installation location of the sensor. In some embodiments, based on the information from the sensors, the controller may further determine how many sensors are placed inside the camera at what locations. For example, when the controller receives two IDs from the sensors, the controller may know that the camera has installed two active sensors.

For purposes of illustration, in the above example of FIG. 2, it assumed that the magnetic field upon the different sensors is a common magnetic field generated by the same set of conductors. In some embodiments, the sensor system may use different sets of conductors to generate different magnetic fields upon different sensors to convey the configuration information. For example, the sensor system may use a first set of two conductors (arranged in the patterns shown in FIG. 2) to configure sensors 211, 221, 231, and 241, whereas use a second set of two conductors (arranged in the patterns shown in FIG. 2) to configure the remaining sensors 251, 261, and 271. In addition, in some embodiments, the conductors may be arranged in direction or angles, and generate a composite magnetic field in a direction or angle different from what is shown in FIG. 2. For example, in regard to sensor 211, the conductors may generate a composite magnetic field at an angle of 125 degrees (or) 125° rather than 112.5 degrees (or 112.5°). Further, in some embodiments, the sensor system may not necessarily use two conductors to form a set of conductors. For example, the sensor system may use a set of three conductors to collectively generate a composite magnetic field in different directions and/or magnitudes relative to sensors at different locations to perform configuration of the sensors. In other words, if the two conductors are considered as a "2-bit" signal transfer channel, the three conductors may be considered as a "3-bit" signal transfer channel. Moreover, the example of FIG. 2 only shows difference in the directions of the composite magnetic field relative to different sensors at different locations. In some embodiments, the difference of a magnetic field relative to different sensors may also include difference in the magnitudes of the magnetic field for different sensors. In other words, the sensor system may use one or more magnetic fields, in different directions and/or magnitudes, to transfer configuration information to respective sensors.

In some embodiments, the sensor system may use one or more of the conductors to cause the sensors to enter an initialization stage. For example, in some embodiments, the sensor system may cause a current to flow through one of the two conductors. In addition, the controller may control the current to have a certain pattern, e.g., the current may be turned on and off at a frequency to thus create a pulsed current. In turn, the pulsed current may generate a pulsed magnetic field upon the sensors. Although the pulsed magnetic field may have different directions and/or magnitudes relative to sensors at different locations, given the magnetic field's unique pattern, sensors 211, 221, 231, 241, 251, 261, and 271 may still be able to recognize the magnetic field. In some embodiments, when the sensors measure this patterned magnetic field, the sensors may automatically enter the initialization stage. Accordingly, as described above, in the initialization, the sensor system may configure the sensor using a magnetic field. For example, the sensor system may change currents of the conductors, e.g., from the pulsed current flowing through one conductor to two continuous DC currents flowing through both conductors, as described above in FIG. 2. The currents of the two conductors collectively may generate a composite magnetic field in different directions and/or magnitudes to transfer respective IDs to the respective sensors.

Figure 3:
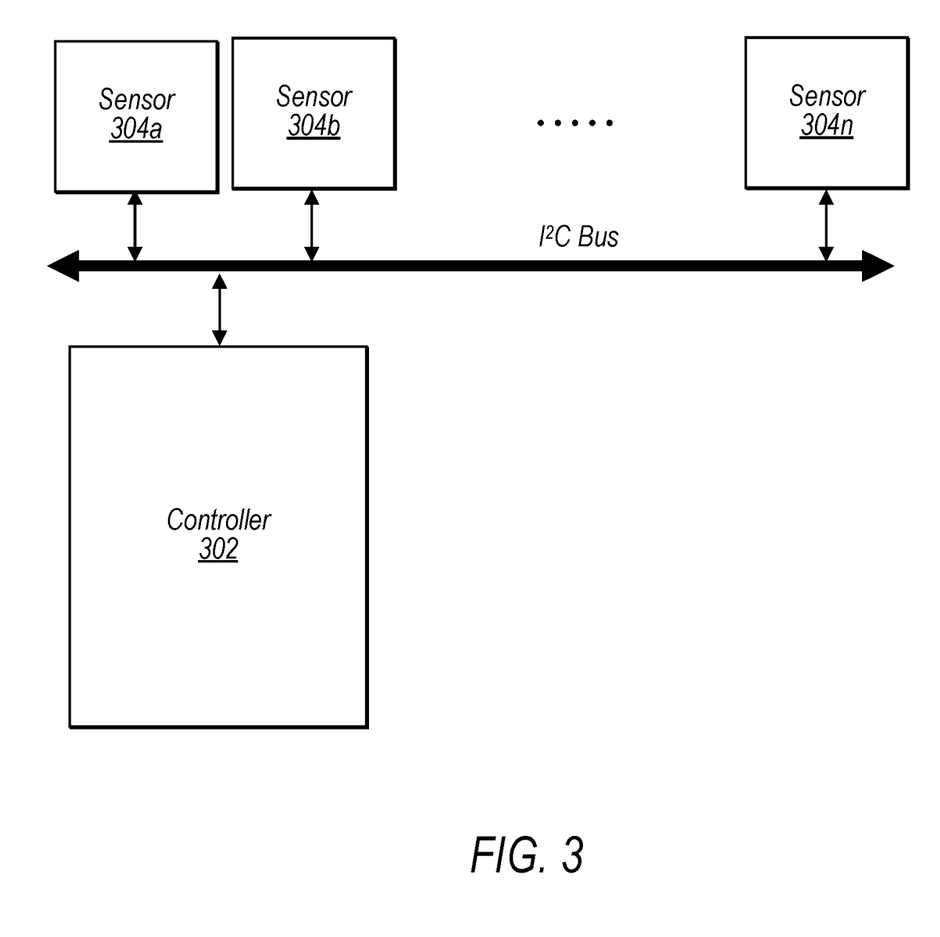
FIG. 3 shows an example communication bus of a sensor system for communications between a controller and sensors, according to some embodiments.

In some embodiments, upon receipt of the IDs and/or measurements from the sensors, the controller may turn off or deactivate currents of the conductors and notify the sensors of the receipt of the information, and then the controller and sensors may proceed to an actuation stage. In the actuation stage, the controller may use the sensors' IDs, e.g., as the sensors' addresses, to communicate with each individual sensor. In some embodiments, the control system may include a communication bus for communications between the controller and sensors in the actuation stage. FIG. 3 shows an example communication bus of a sensor system for communications between a controller and sensors, according to some embodiments. As indicated in FIG. 3, in this example, controller 302 of a sensor system may communicate with sensors 304a, 304b, . . . , 304n using a serial communication bus, e.g., an I²C (Inter-Integrated Circuit) bus. The I²C bus may include at least two electrical wires, e.g., one wire for serial data (or SDA) signal and the other for serial clock (or SCL) signal. In some embodiments, the communication bus may be implemented using wires separate from the conductors used for configuring the sensors at the initiation stage. In some embodiments, sensors 304a, 304b, . . . , 304n may be placed at different locations of a camera, and thus measure the positions of one or more lenses and/or an image sensor of the camera in different directions and/or angles. As described above, prior to the actuation stage, controller 302 may have configured the sensors and obtained their respective IDs in an initialization stage. Thus, in the actuation stage, controller 302 may use the IDs, e.g., as the sensors' addresses, to communicate with each individual one of the sensors through the I²C bus. For example, controller 302 may receive position measurements from sensors 304a, 304b, . . . , 304n, and execute control algorithms based on the position measurements to move the lenses and/or image sensor, or control the positions of these components, to perform AF and/or OIS functions for capturing images, etc.

Figure 4A:
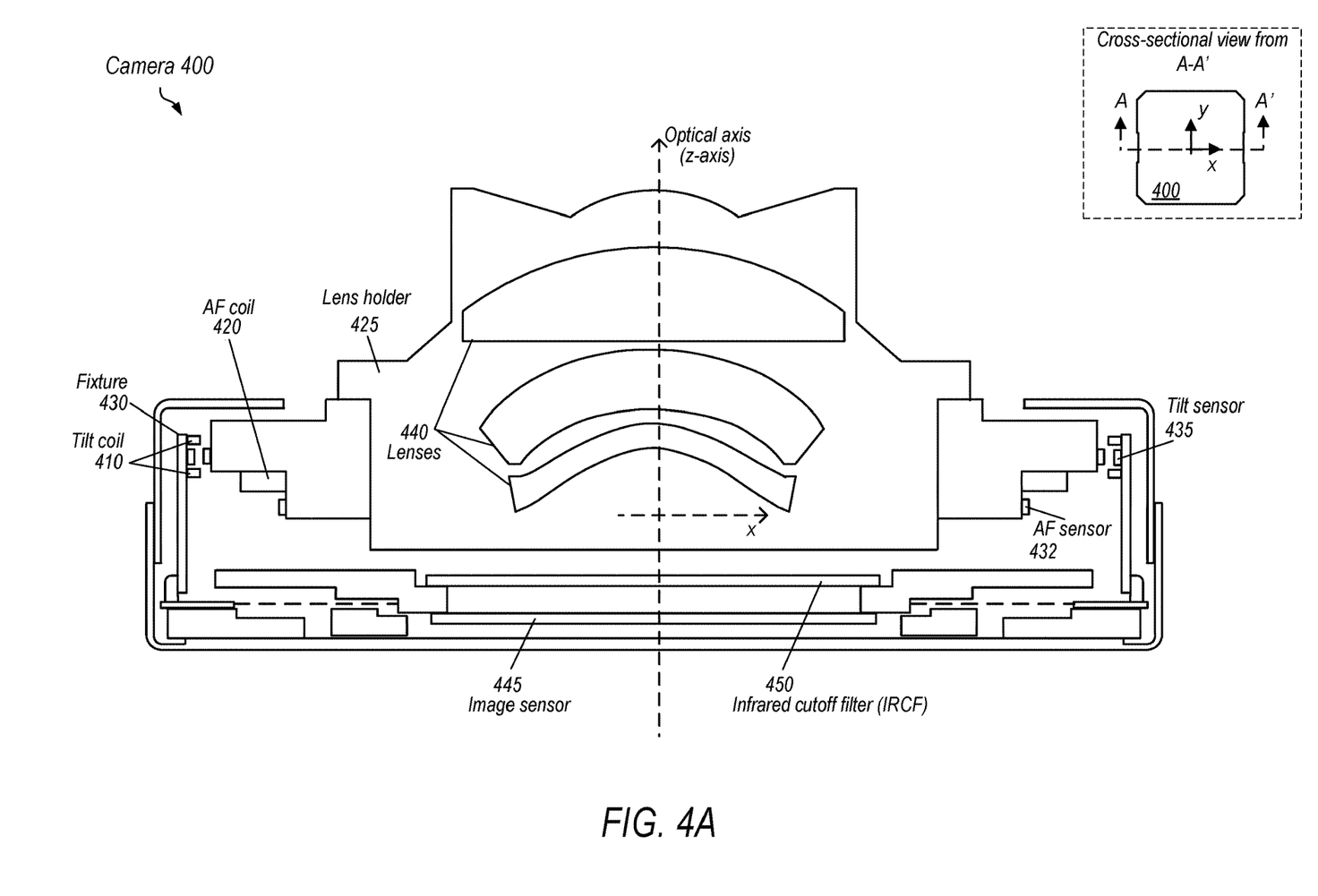
FIGS. 4A-4B show an example camera including a plurality of sensors placed at different locations of the camera, according to some embodiments.
Figure 4B:
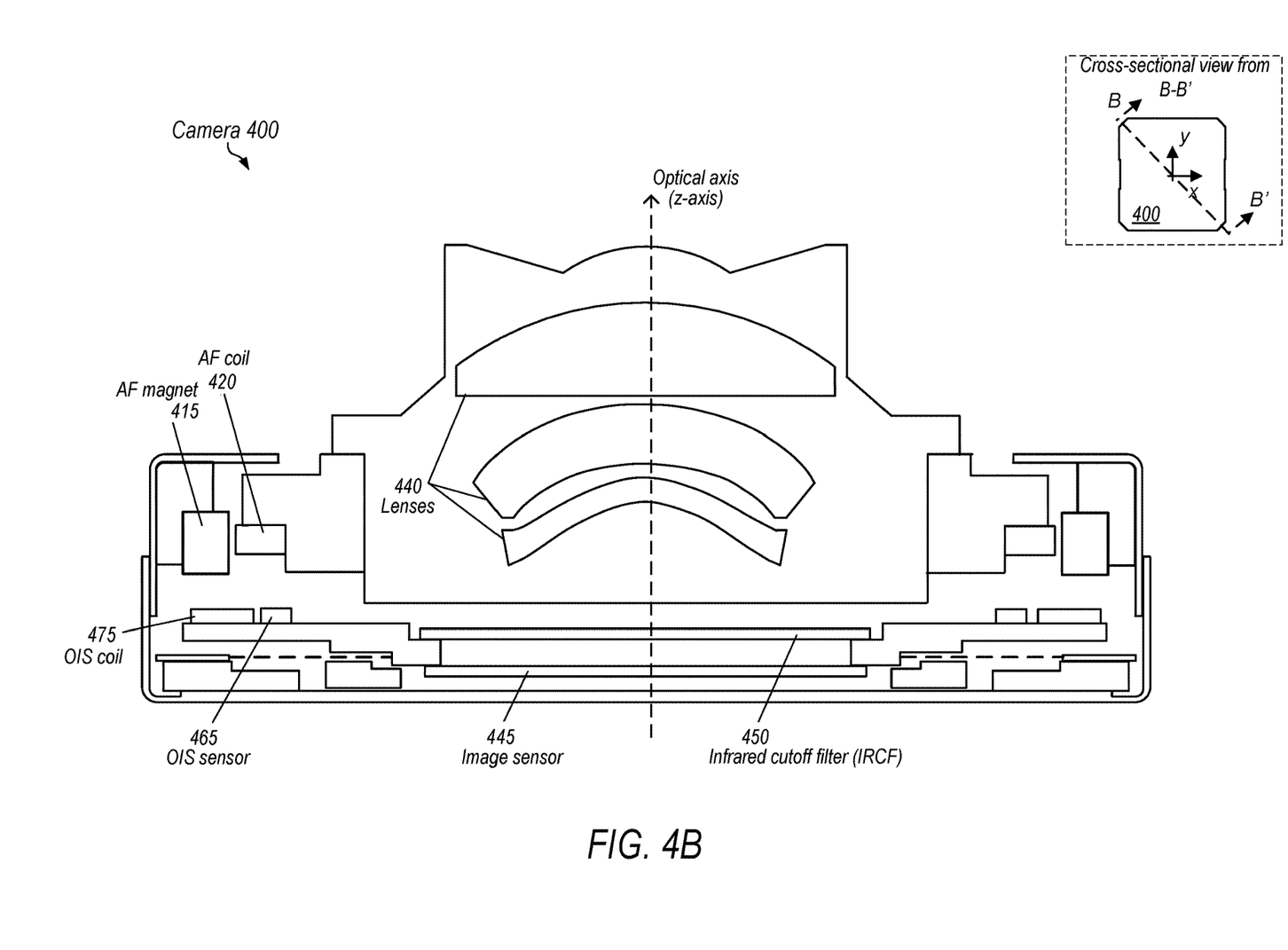

FIGS. 4A-4B show an example camera including a plurality of sensors placed at different locations of the camera, according to some embodiments. In this example, FIG. 4A shows a cross-sectional view of the camera from the perspective of A-A', whereas FIG. 4B shows a cross-sectional view of the camera the perspective of B-B'. As indicated in FIG. 4A, in this example, camera 400 may include a lens group comprising one or more lenses 440, and an image sensor 445. In some embodiments, camera 400 may also include an infrared cutoff filter 450 to block or at least reduce the amount of infrared light reaching image sensor 450. The lenses 440 may define an optical axis (e.g., Z-axis) that passes through the geometrical centers of lenses 440. In some embodiments, camera 400 may include one or more actuators configured to move lenses 440 and image sensor 445 in one or more axes directions, and/or rotate lenses 440 and image sensor 445 around one or more axes. For example, in FIG. 4A, camera 400 may include one or more AF actuators comprising one or more AF coils 420 that are (indirectly) mechanically attached to movable lens holder 425 that contains lenses 440, and one or more corresponding AF magnets 415 (shown in FIG. 4B) that are mechanically attached to stationary fixture 430. By controlling the currents through AF coils 420, motive force (e.g., Lorentz force) may be generated from electromagnetic interactions between AF coils 420 and AF magnets 415 to move lenses 440 in a direction parallel to Z-axis relative to image sensor 445. Thus, the focal distance of camera 400 may be adjusted to perform the AF function. As indicated in FIG. 4A, the AF function may rely on one or more AF sensors 432 that are placed at various locations of camera 400 to measure a translational position of lenses 440 along Z-axis relative to image sensor 445 and/or a stationary component such as fixture 430.

In some embodiments, camera 400 may also include one or more tilt actuators that are configured to rotate lenses 440 and/or image sensor 445 around one or more axes. For example, as indicated in FIG. 4A, camera 400 may include one or more tilt actuators comprising one or more tilt coils 410 and corresponding tilt magnets (not shown). Similar to the AF actuators, the tilt actuators may drive currents through tilt coils 410 to generate motive force to rotate lenses 440 around one or more axes (e.g., x-axis and/or y-axis) orthogonal to Z-axis relative to image sensor 445. As indicated in FIG. 4A, the tilt or rotation of lenses 440 may rely on one or more tilt sensors 435 to measure a rotational position of lenses 440 around x-axis and/or y-axis relative to image sensor 445 and/or a stationary component.

In some embodiments, camera 400 may also include one or more OIS actuators that are configured to move lenses 440 and/or image sensor 445 in one or more directions orthogonal to Z-axis. For example, in FIG. 4B, camera 400 may include one or more OIS actuators comprising one or more OIS coils 475 that are (indirectly) mechanically attached to movable image sensor 445 and one or more corresponding OIS magnets (not shown). Similarly, the OIS actuators may control currents through OIS coils 475 to thus generate motive force to move image sensor 445 in one or more directions (e.g., along x-axis and/or y-axis) orthogonal to Z-axis relative to lenses 440, thus performing the OIS function. As indicated in FIG. 4B, operations of the OIS actuators may rely on one or more OIS sensors 465 to provide measurements of the position of image sensor 445 along x-axis and/or y-axis relative to either lenses 440 and/or a stationary component.

Note that FIGS. 4A-4B are provided only as an example to illustrate that a camera may include a plurality of sensors to measures the positions of lenses and/or image sensor of the camera along different directions and/or around different axes to implement various image capturing related functions, e.g., AF and/or OIS functions. In some embodiments, a camera disclosed herein may include sensors placed locations of the camera differently from the example camera 400. Accordingly, in some embodiments, the camera disclosed herein may perform image capturing related functions different from the example camera 400.

Figure 5:
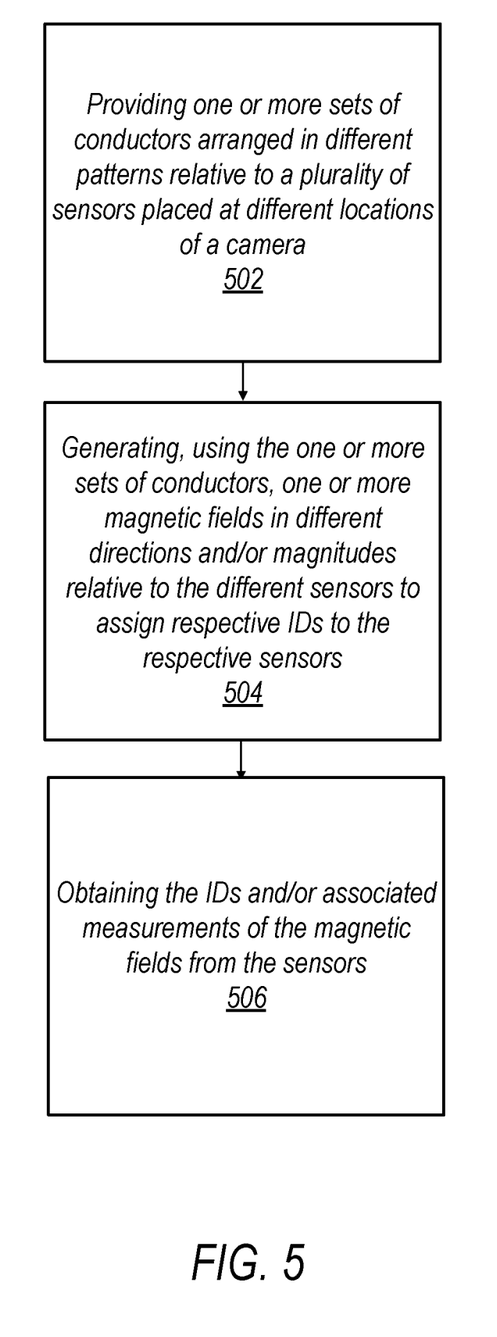
FIG. 5 shows an example flowchart for configuring sensors of a camera, according to some embodiments.

FIG. 5 shows an example flowchart for configuring sensors of a camera, according to some embodiments. As indicated in FIG. 5, in some embodiments, one or more sets of conductors may be routed around a plurality of sensors placed at different locations of a camera, as indicated by block 502. As described above, in some embodiments, the conductors may be arranged in different patterns relative to the sensors at the different locations. In some embodiments, one or more magnetic fields may be generated by conducting respective currents through the conductors. Given that the conductors are arranged in different patterns, the magnetic fields may have different directions and/or magnitudes relative to the different sensors at the different locations. Thus, the difference in the directions and/or magnitudes of the magnetic fields may be used to transfer configuration information, e.g., to assign respective IDs, to the respective sensors, as indicated by block 504. In some embodiments, the individual sensors may include an analog-to-digital conversion circuit and a communication circuit. The sensors may measure the magnetic fields (in the different directions and/or magnitudes) based on measuring their respective resistance, and accordingly acquire the respective IDs. In some embodiments, the IDs and/or other measurements of the magnetic field may be obtained by a controller of the sensor system from the sensors, as indicated by block 506. In some embodiments, based on the IDs and measurements of the sensors, the controller may determine respective locations of the sensors.

Figure 6:
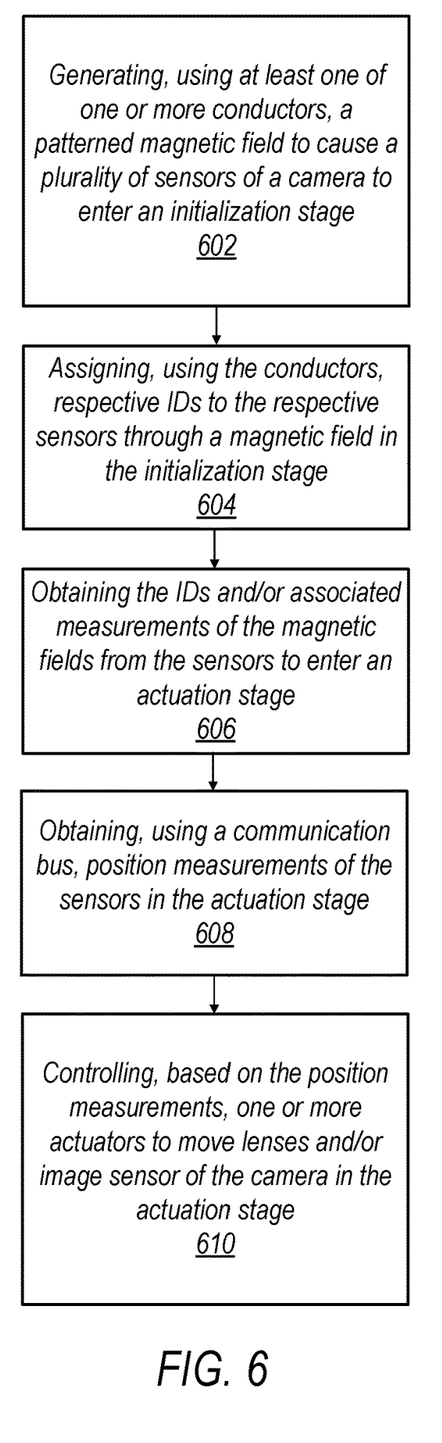
FIG. 6 shows an example flowchart for using sensors of a camera to perform AF and/or OIS functions, according to some embodiments.

FIG. 6 shows an example flowchart for using sensors of a camera to perform AF and/or OIS functions, according to some embodiments. As indicated in FIG. 6, in some embodiments, a patterned magnetic field may be generated, using at least one of one or more conductors of a sensor system, to cause a plurality of sensors placed at different locations of a camera to enter an initialization stage, as indicated by block 602. As described above, in some embodiments, the patterned magnetic field may be generated using a pulsed current, e.g., by turning on and off the current of a conductor at a frequency. In some embodiments, the sensor system may assign respective IDs to the respective sensors using a magnetic field, as indicated by block 604. For example, as described above, the conductors may be arranged in different layouts relative to the sensors at different locations, such that the respective sensors may obtain measurements of magnetic field(s) generated by the conductors in different directions and/or magnitudes. Based on the different measurements, the respective sensors may acquire corresponding IDs. In some embodiments, the IDs and/or other measurements of the magnetic field may be obtained by a controller of the sensor system from the sensors, as indicated by block 606. In some embodiments, upon receipt of the information, the controller and sensors may enter an actuation stage. In some embodiments, in the actuation stage, the positions of one or more lenses and/or an image sensor of the camera may be measured by the sensors at the different locations, and the position measurements may be obtained by the controller of the sensor system, as indicated by block 608. As described above, in some embodiments, the controller may use a communication bus, e.g., a serial communication bus such as an I²C bus, to communicate with the sensors. In some embodiments, the controller may execute one or more algorithms to control one or more actuators, based on the position measurements from the sensors, to move the lenses and/or image sensor in various directions or rotate these components around various axes to perform various image capturing relative functions, e.g., AF and/or OIS functions, as indicated by block 610.

Figure 7:
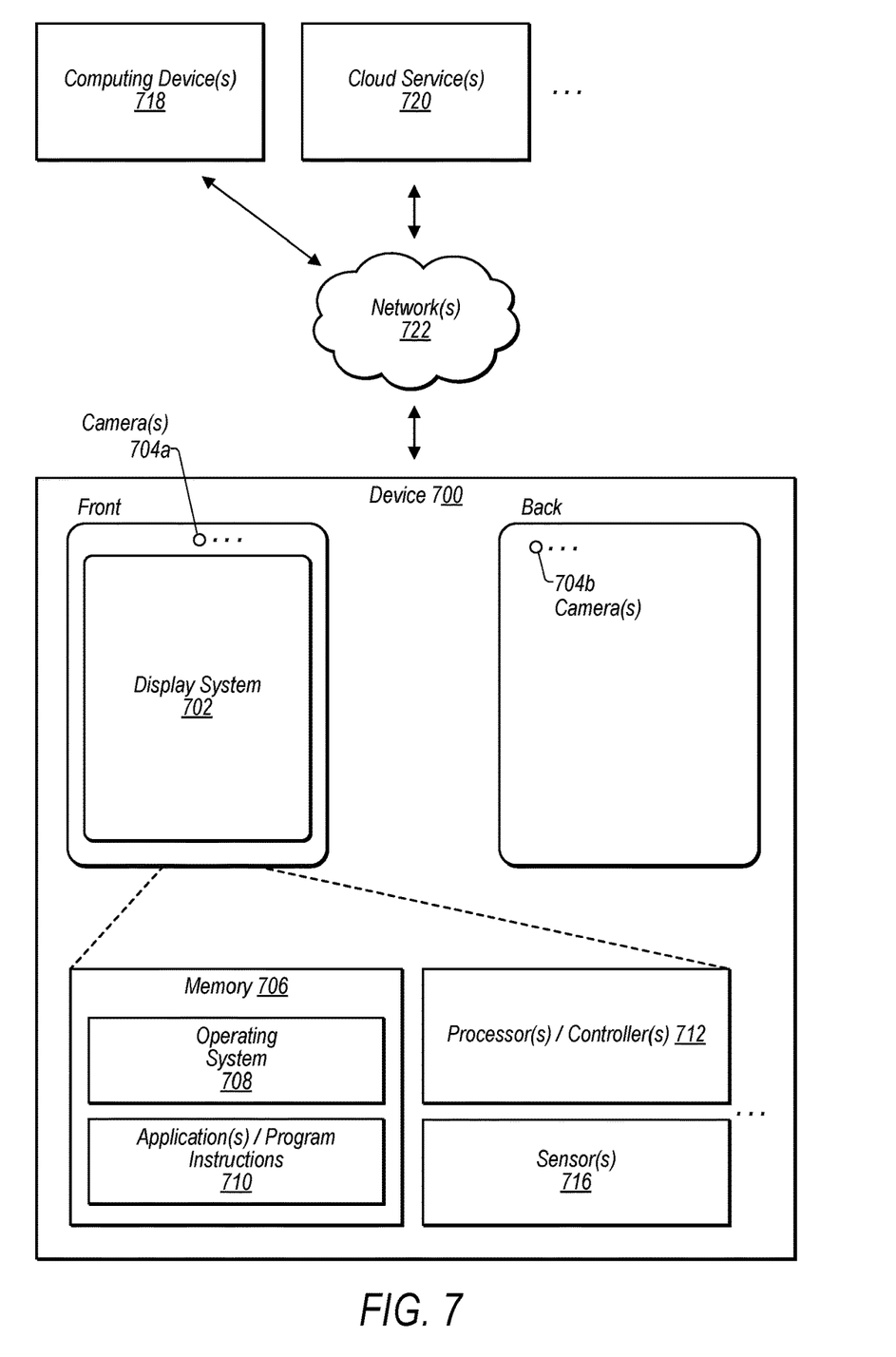
FIG. 7 illustrates a schematic representation of an example device that may include a camera having a sensor system, according to some embodiments.

FIG. 7 illustrates a schematic representation of an example device 700 that may include a camera having a sensor system as described above, according to some embodiments. In some embodiments, the device 700 may be a mobile device and/or a multifunction device. In various embodiments, the device 700 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 700 may include a display system 702 (e.g., comprising a display and/or a touch-sensitive surface) and/or one or more cameras 704. In some non-limiting embodiments, the display system 702 and/or one or more front-facing cameras 704a may be provided at a front side of the device 700, e.g., as indicated in FIG. 7. Additionally, or alternatively, one or more rear-facing cameras 704b may be provided at a rear side of the device 700. In some embodiments comprising multiple cameras 704, some or all of the cameras may be the same as, or similar to, each other. Additionally, or alternatively, some or all of the cameras may be different from each other. In various embodiments, the location(s) and/or arrangement(s) of the camera(s) 704 may be different than those indicated in FIG. 7.

Among other things, the device 700 may include memory 706 (e.g., comprising an operating system 708 and/or application(s)/program instructions 710), one or more processors and/or controllers 712 (e.g., comprising CPU(s), memory controller(s), display controller(s), and/or camera controller (s), etc.), and/or one or more sensors 716 (e.g., orientation sensor(s), proximity sensor(s), and/or position sensor(s), etc.). In some embodiments, the device 700 may communicate with one or more other devices and/or services, such as computing device(s) 718, cloud service(s) 720, etc., via one or more networks 722. For example, the device 700 may include a network interface (e.g., network interface 710) that enables the device 700 to transmit data to, and receive data from, the network(s) 722. Additionally, or alternatively, the device 700 may be capable of communicating with other devices via wireless communication using any of a variety of communications standards, protocols, and/or technologies.

Figure 8:
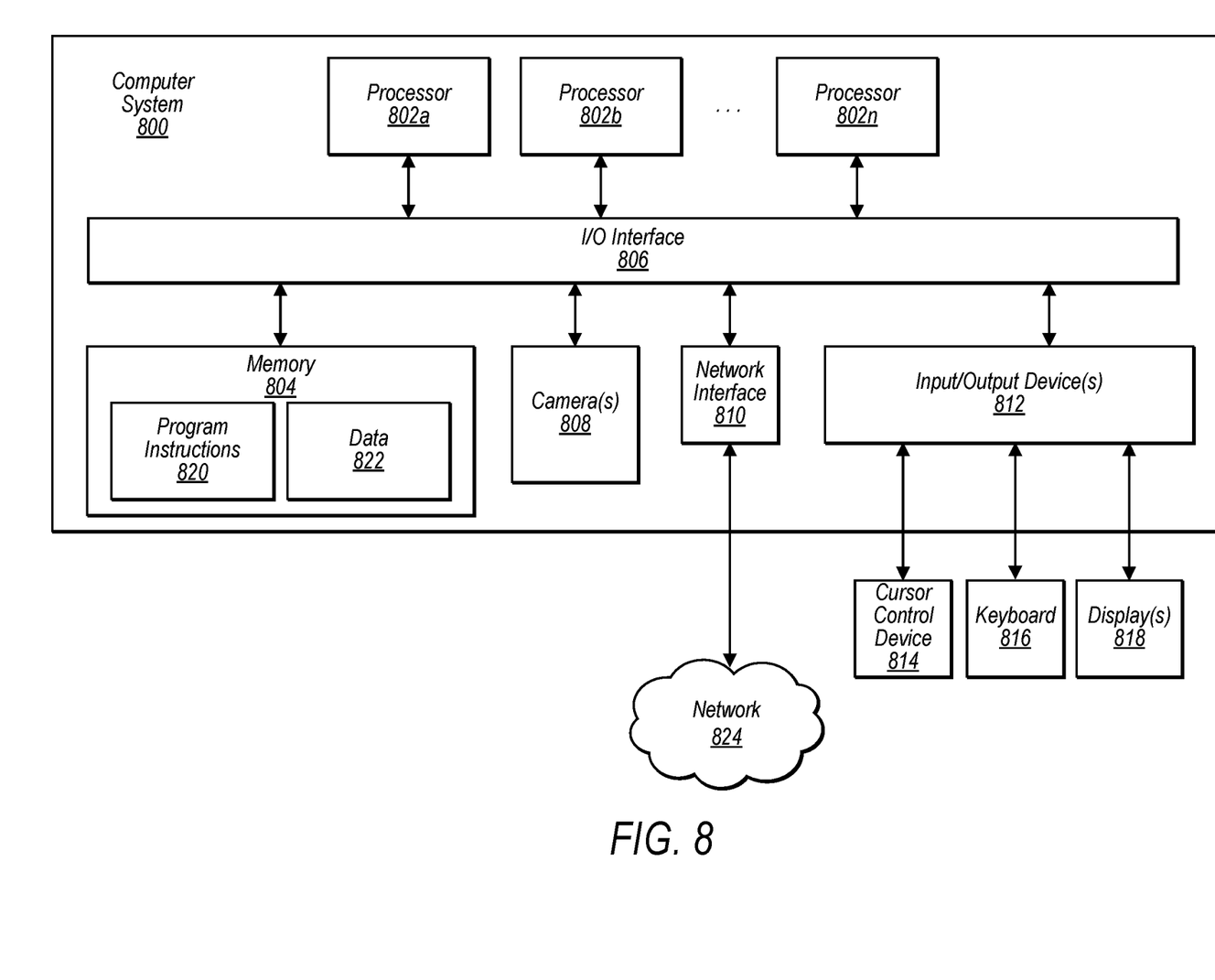
FIG. 8 illustrates a schematic block diagram of an example computing device that may include or host embodiments of a computer device including a camera having a sensor system, according to some embodiments.

FIG. 8 illustrates a schematic block diagram of an example computing device, referred to as computer system yy8, that may include or host embodiments of a computer device including a camera having a sensor system as described above, according to some embodiments. In addition, computer system 800 may implement methods for controlling operations of the camera and/or for performing image processing images captured with the camera. In some embodiments, the device 1000 (described above with reference to FIG. 7) may additionally, or alternatively, include some or all of the functional components of the computer system 800 described herein.

The computer system 800 may be configured to execute any or all of the embodiments described above. In different embodiments, computer system 800 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 800 includes one or more processors 802 coupled to a system memory 804 via an input/output (I/O) interface 806. Computer system 800 further includes one or more cameras 808 coupled to the I/O interface 806. Computer system 800 further includes a network interface 810 coupled to I/O interface 806, and one or more input/output devices 812, such as cursor control device 814, keyboard 816, and display(s) 818. In some cases, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 802, or a multiprocessor system including several processors 802 (e.g., two, four, eight, or another suitable number). Processors 802 may be any suitable processor capable of executing instructions. For example, in various embodiments processors 802 may be general-purpose or embedded processors implementing any of a variety of instruction set architectures (ISAs), such as the x86, PowerPC, SPARC, or MIPS ISAs, or any other suitable ISA. In multiprocessor systems, each of processors 802 may commonly, but not necessarily, implement the same ISA.

System memory 804 may be configured to store program instructions 820 accessible by processor 802. In various embodiments, system memory 804 may be implemented using any suitable memory technology, such as static random access memory (SRAM), synchronous dynamic RAM (SDRAM), nonvolatile/Flash-type memory, or any other type of memory. Additionally, existing camera control data 822 of memory 804 may include any of the information or data structures described above. In some embodiments, program instructions 820 and/or data 822 may be received, sent or stored upon different types of computer-accessible media or on similar media separate from system memory 804 or computer system 800. In various embodiments, some or all of the functionality described herein may be implemented via such a computer system 800.

In one embodiment, I/O interface 806 may be configured to coordinate I/O traffic between processor 802, system memory 804, and any peripheral devices in the device, including network interface 810 or other peripheral interfaces, such as input/output devices 812. In some embodiments, I/O interface 806 may perform any necessary protocol, timing or other data transformations to convert data signals from one component (e.g., system memory 804) into a format suitable for use by another component (e.g., processor 802). In some embodiments, I/O interface 806 may include support for devices attached through various types of peripheral buses, such as a variant of the Peripheral Component Interconnect (PCI) bus standard or the Universal Serial Bus (USB) standard, for example. In some embodiments, the function of I/O interface 806 may be split into two or more separate components, such as a north bridge and a south bridge, for example. Also, in some embodiments some or all of the functionality of I/O interface 806, such as an interface to system memory 804, may be incorporated directly into processor 802.

Network interface 810 may be configured to allow data to be exchanged between computer system 800 and other devices attached to a network 824 (e.g., carrier or agent devices) or between nodes of computer system 800. Network 824 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 810 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 812 may, in some embodiments, include one or more display terminals, keyboards, keypads, touchpads, scanning devices, voice or optical recognition devices, or any other devices suitable for entering or accessing data by one or more computer systems 800. Multiple input/output devices 812 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 810.

Those skilled in the art will appreciate that computer system 800 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
   a lens group comprising one or more lenses;
   an image sensor configured to receive light that passes through the lenses of the lens group to generate signals for producing images;
   a plurality of sensors configured to measure a position of the lens group, a position of the image sensor, or a combination thereof;
   one or more actuators configured to move the lens group, the image sensor, or a combination thereof based on measurements of the sensors; and
   a control circuit configured to:
     generate a magnetic field on the sensors; and
     assign respective IDs (identifications) to respective ones of the sensors using the magnetic field.

2. The system of claim 1, wherein the control circuit comprises multiple conductors configured to conduct currents to collectively generate the magnetic field, wherein the conductors are arranged in different patterns relative to the respective sensors such that the currents collectively generate the magnetic field in different directions, different magnitudes, or combinations thereof relative to the respective sensors.

3. The system of claim 2, wherein the control circuit is configured to:
   cause the sensors to enter an initialization stage using a magnetic field generated by at least one of the conductors; and
   assign the respective IDs to the respective sensors during the initialization stage.

4. The system of claim 3, wherein the initialization stage is prior to a stage in which the sensors are used to measure the position of the lens group, the position of the image sensor, or the combination thereof based on which the actuators move the lens group, the image sensor, or the combination thereof.

5. The system of claim 1, wherein the control circuit is further configured to determine respective locations of the respective sensors based on the respective IDs of the respective sensors.

6. The system of claim 1, wherein the control circuit comprises a controller that is configured to:
   obtain the measurements of the sensors through a communication bus based on the IDs of the sensors; and
   provide control signals to the actuators through the communication bus to move the lens group, the image sensor, or the combination thereof based on the measurements obtained from the sensors.

7. The system of claim 6, wherein the communication bus is an I$^2$C (Inter-Integrated Circuit) bus.

8. The system of claim 1, wherein the sensors comprise at least some of: TMR (tunnel magnetoresistance) sensors, GMR (giant magnetoresistance) sensors, or Hall effect sensors.

9. The system of claim 1, wherein the actuators are configured to move the lens group, the image sensor, or the combination thereof in a direction parallel to an optical axis of the lenses of the lens group.

10. The system of claim 1, wherein the actuators are configured to move the lens group, the image sensor, or the combination thereof in one or more directions orthogonal to an optical axis of the lenses of the lens group.

11. The system of claim 1, wherein the actuators are configured to rotate the lens group, the image sensor, or the combination thereof around one or more axes including an axis parallel to an optical axis of the lenses of the lens group or an axis orthogonal to the optical axis of the lenses of the lens group.

12. A device, comprising:
a camera configured to provide image signals;
a processor configured to process the image signals to produce an image; and
a display configured to display the image generated by the processor,
wherein the camera comprises:
a lens group comprising one or more lenses;
an image sensor configured to receive light that passes through the lenses of the lens group to generate the image signals;
a plurality of sensors configured to measure a position of the lens group, a position of the image sensor, or a combination thereof;
one or more actuators configured to move the lens group, the image sensor, or a combination thereof based on measurements of the sensors; and
a control circuit configured to:
generate a magnetic field on the sensors; and
assign respective IDs (identifications) to respective ones of the sensors using the magnetic field.

13. The device of claim 12, wherein the control circuit comprises multiple conductors configured to conduct currents to collectively generate the magnetic field, wherein the conductors are arranged in different patterns relative to the respective sensors such that the currents collectively generate the magnetic field in different directions, different magnitudes, or combinations thereof relative to the respective sensors.

14. The device of claim 13, wherein the control circuit is configured:
cause the sensors to enter an initialization stage using a magnetic field generated by at least one of the conductors; and
assign the respective IDs to the respective sensors during the initialization stage,
wherein the initialization stage is prior to a stage in which the sensors are used to measure the position of the lens group, the position of the image sensor, or the combination thereof based on which the actuators move the lens group, the image sensor, or the combination thereof.

15. The device of claim 12, wherein the control circuit is further configured to determine respective locations of the respective sensors based on the respective IDs of the respective sensors.

16. The device of claim 12, wherein the control circuit comprises a controller that is configured to:
obtain the measurements of the sensors through an I²C (Inter-Integrated Circuit) bus based on the IDs of the sensors; and
provide control signals to the actuators through the I²C bus to move the lens group, the image sensor, or the combination thereof based on the measurements obtained from the sensors.

17. The device of claim 12, wherein the sensors comprise at least some of: TMR (tunnel magnetoresistance) sensors, GMR (giant magnetoresistance) sensors, or Hall effect sensors.

18. The device of claim 12, wherein the actuators are configured to:
move the lens group, the image sensor, or the combination thereof in one or more directions including a direction parallel to an optical axis of the lenses of the lens group, or a direction orthogonal to the optical axis of the lenses of the lens group; or
rotate the lens group, the image sensor, or the combination thereof around one or more axes including an axis parallel to the optical axis of the lenses of the lens group or an axis orthogonal to the optical axis of the lenses of the lens group.

19. A method, comprising:
receiving, using one or more lenses of a lens group of a camera, light from an environment of the camera;
generating, using an image sensor of the camera, signals based on the light passing through the lenses of the lens group to the image sensor;
assigning, using a control circuit of the camera, respective IDs (identifications) to respective ones of a plurality of sensors of the camera using a magnetic field generated upon the sensors;
measuring, using the sensors, a position of the lens group, a position of the image sensor, or a combination thereof; and
controlling, using one or more actuators of the camera, the position of the lens group, the position of the image sensor, or a combination thereof based on measurements from the sensors.

20. The method of claim 19, wherein the control circuit comprises multiple conductors, wherein assigning the respective IDs to the respective sensors comprises:
arranging the conductors in different patterns relative to the respective ones of the sensors; and
providing currents to the conductors to collectively generate the magnetic field upon the sensors, such that the currents collectively generate the magnetic field in different directions, different magnitudes, or combinations thereof relative to the respective sensors.

* * * * *